UNITED STATES PATENT OFFICE.

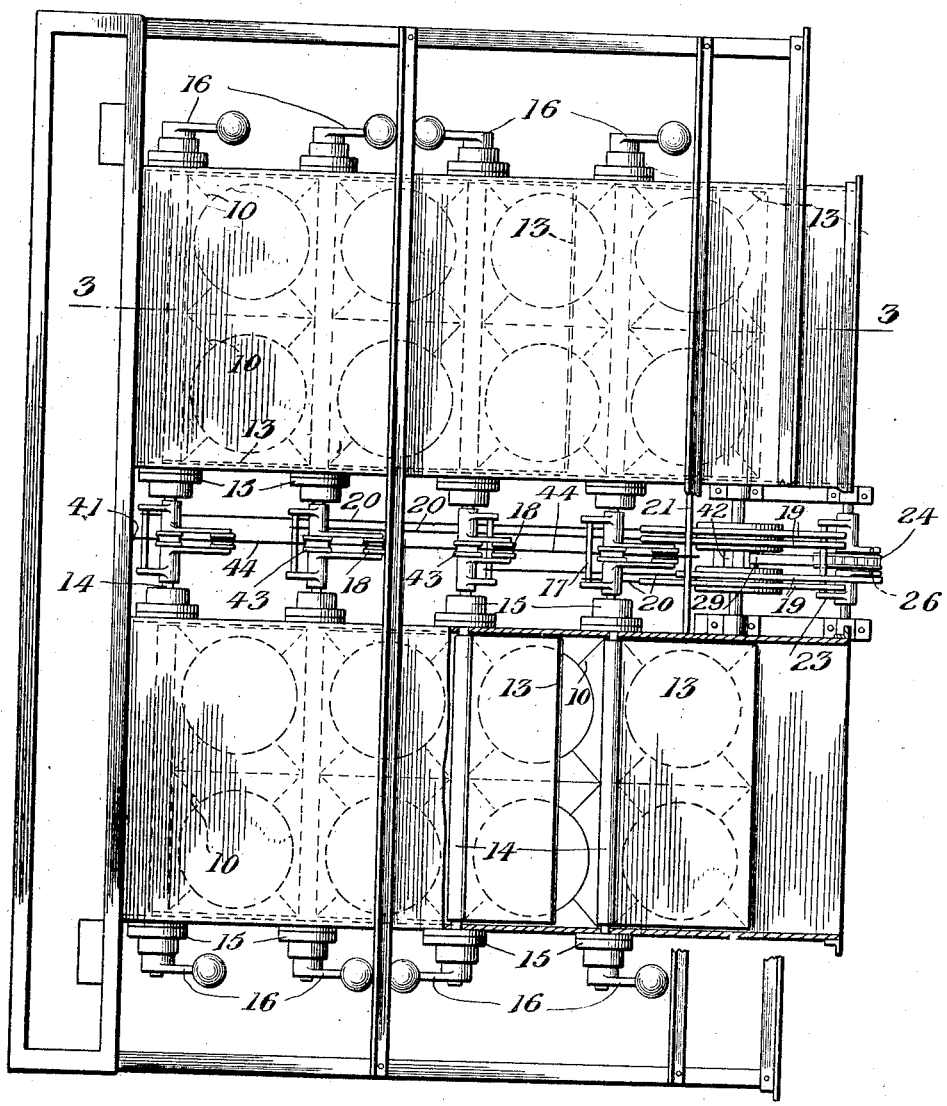

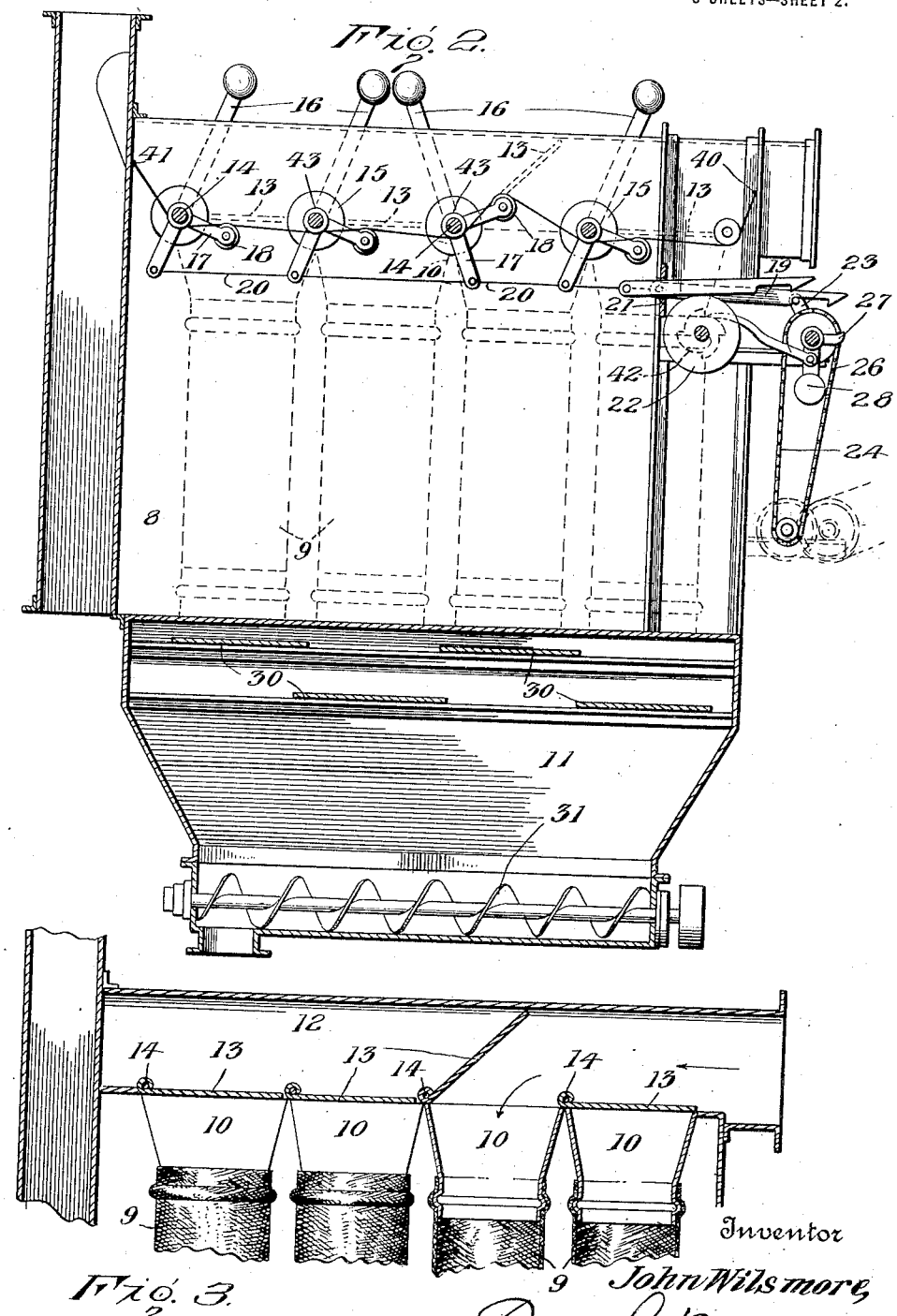

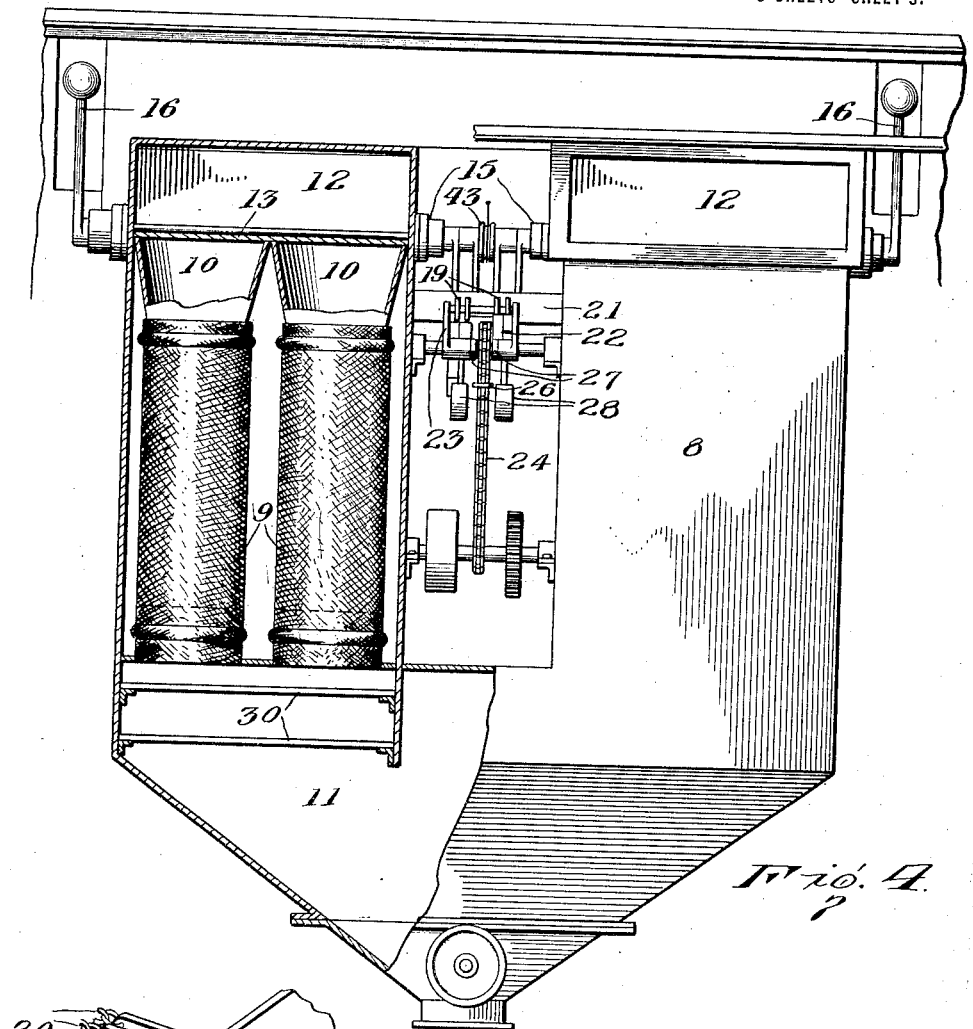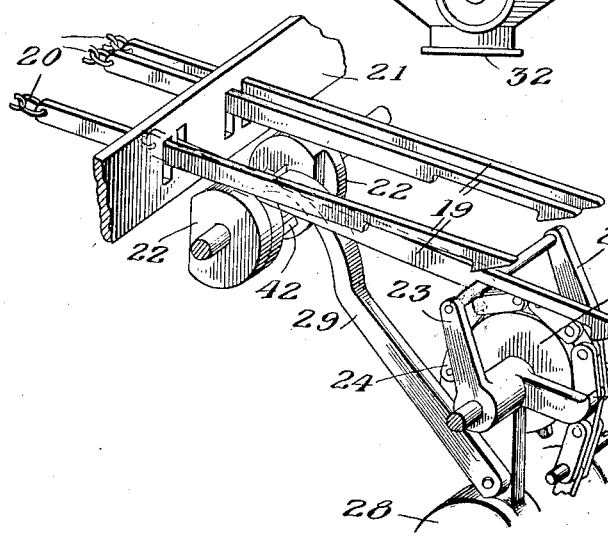

JOHN WILSMORE, OF WOOLLAHRA, NEAR SYDNEY, NEW SOUTH WALES, AUSTRALIA.

PNUEMATIC DUST-COLLECTING SYSTEM AND APPARATUS THEREFOR.

1,349,480.     Specification of Letters Patent.     Patented Aug. 10, 1920.

Application filed November 13, 1919. Serial No. 337,664.

*To all whom it may concern:*

Be it known that I, JOHN WILSMORE, a subject of the King of Great Britain, residing at Woollahra, near Sydney, in the State of New South Wales, Commonwealth of Australia, have invented certain new and useful Improvements in Pneumatic Dust-Collecting Systems and Apparatus Therefor, of which the following is a specification.

This invention has reference to systems whereby dust laden air in factories, warehouses, and other places is drawn or forced through a series of hose or tubes of suitable textile fabric such as canvas, gauze, or the like material or metal whereby the dust laden air is filtered and the dust particles removed.

Broadly, the invention consists in the method of successively cleaning the filtering surfaces. This is effected by successively directing the whole volume of dust laden air through one or some of the filter hose preferably a minority of them at a high velocity in order to dislodge the dust collected therein and adhering to the interior and forcing same into a dust storage chamber below. The dust laden air after passing therethrough enters the remaining—preferably a majority—filter hose at a lower velocity thereby permitting the filtering process to be maintained continuously in successive hose without curtailing the filtering surface.

The dust laden air is first forced into a distributing or plenum chamber provided with two or more hopper bottoms to each of which is connected a filter hose or tube in communication with the dust storage chamber. A valve or gate of any suitable construction is provided for each hose or tube which valves are so controlled that one or more (preferably a minority of the whole) will remain open at one time. These valves may be opened successively by mechanism driven from an independent source or through gearing operated by a propeller fixed in the path of the incoming air thereby making the apparatus automatic.

But in order that the invention may be readily comprehended I will now refer to the accompanying drawings which illustrate the preferred form of apparatus which may be placed either on the compression or depression side of the fan or pump employed.

Figure 1 is a plan, partly in section, of a battery of 16 filter tubes.

Fig. 2 is a longitudinal sectional elevation.

Fig. 3 is a sectional elevation on line 3—3, Fig. 1.

Fig. 4 is an elevation partly in section.

Fig. 5 is a perspective view of the intermittent operating mechanism.

The same reference numerals indicate the same or corresponding parts.

The apparatus is suitably supported and comprises a casing 8 in which are contained a series of filter hose 9 and the valve controlling mechanism operated by gearing external the casing.

The filter pipes or hose 9 may be in any number of convenient length and diameter and are composed of canvas, metal gauze, or other suitable porous material. The hose pipes are suspended vertically from hoppers 10 and at bottom lead to a dust settling and storage chamber 11. The hoppers at the top are connected with the under sides of horizontal plenum chambers 12 and have gates or valves 13 adapted to be operated over the mouths of said hoppers. In the drawings each pair of valves 13 is secured to a transverse shaft 14 provided with dust proof bearings 15 at the sides of the chamber 12 each pair operating over two pairs of hoppers. Keyed to the shaft 14 outside the chambers 12 are lever balance weights 16 to maintain the valves steady in position either when open or shut and between said chambers are rockers 17 each carrying grooved pulleys 18 and 43. Over pulley 18 and under pulley 43 passes a wire or like flexible connection 44 fixed to opposite ends of the casing at 40—41. The intermittent gear comprises bars 19 connected by wires 20 to the respective rockers 17 operating the valves 13 and pass through guide openings 21 so as to rest normally at a slight upward angle on cams 22. These cams are faced to permit successively one bar 19 to drop to a horizontal position and engage a rocker 23 operated intermittently by a roller chain 24 which runs continuously over a loose sprocket wheel 25. This chain 24 has a projecting link pin 26 adapted to engage an arm 27 secured to the rocker 23 which has also balance weights 28 to return it to its normal position when the arm is released by the link pin 26. Motion is transmitted from the rocker 23 to the cams 22 by means of a pawl 29 and ratchet 42. The chain 24 is operated continuously by gearing driven from any convenient source or it may be driven by a propeller placed in the path of the incoming air.

In the settling and storage chamber 11 are baffle plates 30 and below them is preferably a screw conveyer 31 to convey the dust to the discharge opening 32 and said conveyer may be operated by belting or by hand according to the capacity of the installation.

In operation, if the air is heavily charged with dust it may be first passed though a centrifugal to remove the heavier particles or it may be passed direct from the fan or pump of the pneumatic system to the inlet passage leading to the distributing chamber. From thence the air is forced at a comparatively high velocity down the filter hose whose valves have been opened by operation of their respective cams and dislodges the dust collected and adhering to the inside of these filter hose precipitating it into the settling and storage chamber below. At the same time some air passes through the interstices of the fabric of said tubes. The air which has passed down these tubes after being distributed over the whole area of the settling chamber by means of the baffle plates or deflectors loses its high velocity and enters the remaining filter hose (whose gates are closed) at a comparatively low velocity passing through the interstices of the fabric or material. The filtering process proceeds continuously and the cleaning takes place concurrently without curtailing the filtering area and the air after being filtered passes through a discharge opening in the casing which is otherwise airtight.

The gear may be set to allow the valves to remain open for any period desired which should be just long enough for the air passing therethrough at high velocity to thoroughly clean the interior of the respective filter hose. The valve or valves of another or other filter hose is or are then opened and at the same time the valve or valves of those just cleaned are closed and the operation repeated in successive filter hoses continuously. Owing to the flexible wire being of a fixed length when the next succeeding rocker 17 is actuated by means of its respective bar 19 the wire bearing on the pulleys of the preceding rocker causes it to fall downwardly taking its valve with it to close the opening.

Having thus described my invention, I claim:—

1. In a pneumatic dust collecting system provided with a series of porous filter hose or tubes, successively directing the dust laden air through certain of said tubes at a high velocity to dislodge the dust particles collected therein to a storage chamber and then leading the air from said chamber at a lower velocity to the remaining tubes closed at their opposite ends whereby it filters through the interstices of the fabric of the tubes.

2. In a pneumatic dust collecting system provided with a series of porous filter hose or tubes, directing the dust laden air through a minority of said tubes successively at a high velocity to dislodge the dust particles collected therein to a storage chamber and then leading the air from said chamber at a lower velocity to a majority of the filter tubes closed at their opposite ends whereby it filters through the interstices of the majority tubes.

3. In a pneumatic dust collecting system provided with a series of porous filter hose or tubes, forcing the dust laden air into a distributing chamber from which said tubes are depended, a minority being adapted to be open to said chamber successively on operation of a gate while a majority is closed to said chamber successively, said tubes being constantly open to a dust collecting chamber below.

4. In a pneumatic dust collecting system provided with a series of porous filter hose or tubes, a casing having an inlet for the dust laden air and an outlet for the filtered air, a distributing chamber in communication with said inlet and having a series of said tubes dependent therefrom, a series of gates or valves controlling the tubes and adapted to be operated intermittently by suitable gearing to open a minority and close a majority of said hose successively substantially as described.

5. In a pneumatic dust collecting system provided with a series of porous filter hose or tubes as in claim 4, valves or gates on a transverse shaft operable over the mouths of the several hose or tubes, balance weights on said shaft, rockers each carrying grooved pulleys and a flexible connection fixed to opposite ends of the casing and taking over said pulleys substantially as described and as illustrated.

6. In a pneumatic dust collecting system provided with a series of porous filter hose or tubes and as in claim 4, means for successively opening the valves or gates comprising a rocker actuated intermittently and adapted to partially rotate, cam means whereby a series of bars resting thereon and connected to respective valves is successively brought into a position to be engaged and moved by said rocker to open the valve to which it is connected substantially as described and as illustrated.

7. In a pneumatic dust collecting system provided with a series of porous filter hose or tubes and as in claim 4, a settling chamber provided with baffles or deflectors and a rotatable screw conveyer for removing the collected dust particles outside the casing substantially as described and as illustrated.

In witness whereof I have hereunto set my hand.

JOHN WILSMORE.